United States Patent [19]
Rowe et al.

[11] 3,820,272
[45] June 28, 1974

[54] BAIT TANK AERATION DEVICE

[76] Inventors: Joseph L. Rowe, 5809 Barberry Ln., Portsmouth, Va. 23701; Leeman S. Meeker, Rt. 2 Box 212, Smithfield, Va. 23430; Deleon Everette Calamas, 4020 Threechopt Rd., Hampton, Va. 23366

[22] Filed: Mar. 30, 1972

[21] Appl. No.: 239,621

[52] U.S. Cl. .................. 43/57, 55/323, 261/121 M
[51] Int. Cl. ............................................. A01k 97/04
[58] Field of Search ........ 43/57, 56, 55; 261/121 M, 261/122; 55/274, 523; 119/5

[56] References Cited
UNITED STATES PATENTS

| 710,325 | 9/1902 | Kern et al. | 119/5 |
| 754,317 | 3/1904 | Kaltenegger et al. | 119/5 |
| 2,767,509 | 10/1956 | Breithaupt | 43/57 |
| 2,772,867 | 12/1956 | Cleckner | 43/57 X |
| 2,936,542 | 5/1960 | Butler et al. | 43/57 |
| 3,352,091 | 11/1967 | Dvorkin | 55/274 |
| 3,390,514 | 7/1968 | Raschke | 55/274 X |
| 3,640,516 | 2/1972 | Willinger | 261/121 M |

*Primary Examiner*—James H. Czerwonky
*Attorney, Agent, or Firm*—Watson, Cole, Grindle and Watson

[57] ABSTRACT

A water filled bait tank is aerated with the use of a compressed air bottle permitting filtered air to be metered into the tank through a porous air stone. Metering is accomplished by a removable valve unit having a threaded needle valve mounted therein. A filter is also mounted in the unit.

1 Claim, 1 Drawing Figure

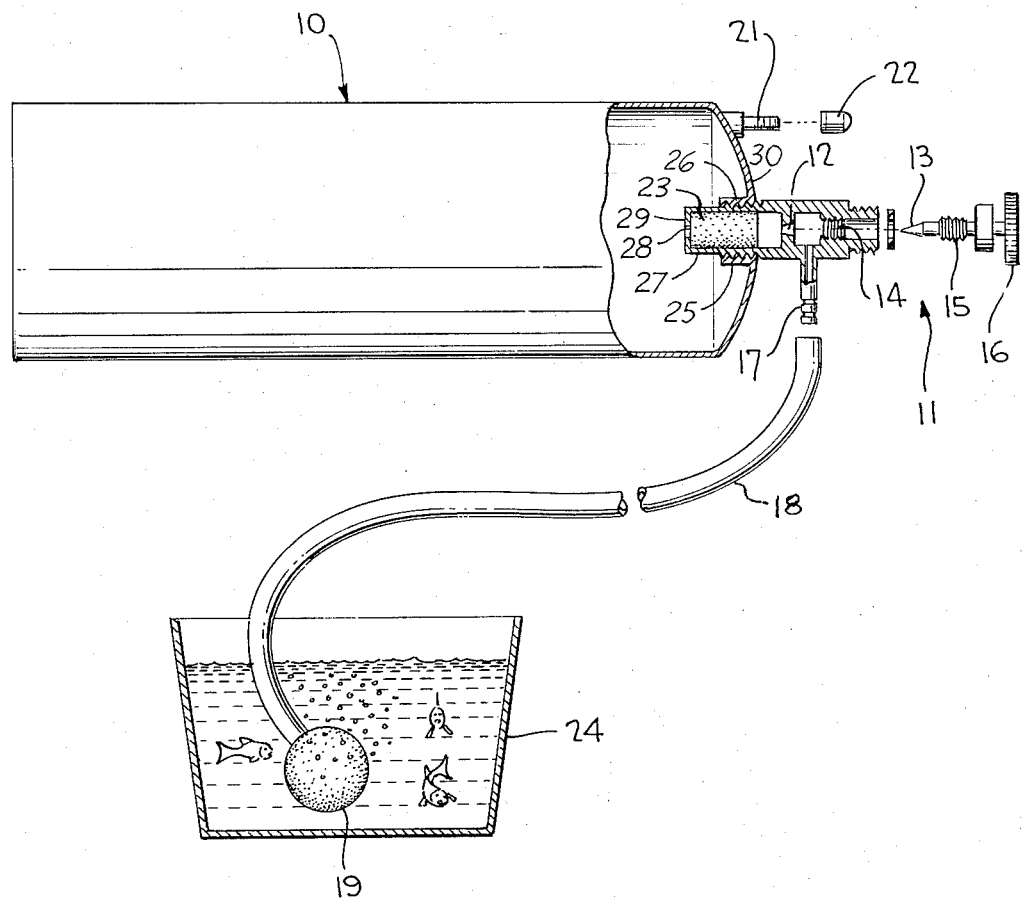

BAIT TANK AERATION DEVICE

This invention relates generally to a portable aeration device and more particularly to a device for aerating a bait tank with the use of a compressed air bottle.

The known aerating devices for live bait tanks, aquariums, and similar uses generally require a motor driven pump or the like for conducting air into the water container for aeration thereof. Needless to say, such devices are cumbersome and relatively expensive and, most importantly, are not portable for use by the ordinary fisherman who requires his live bait to remain vitalized while transporting them over considerable distances during fishing trips. Heretofore, the fisherman would either risk the chance that his live bait would not be in need of aeration or, if convenient, would aerate his bait tank with the use of the aforementioned motor driven pump device.

In accordance with ths principal object of the present invention, an aerating device for bait or aquarium uses has been devised which makes use of a compressed air bottle capable of metering a filtered quantity of compressed air into a live bait tank in an economical, efficient and highly effective manner.

Another object of this invention is to provide such a device wherein a porous air stone or diffuser is connected by means of a tube with a needle-nose valve on the compressed air bottle whereby fine and evenly distributed air may be delivered to the tank.

A further object of this invention is to provide such a device wherein an air filter is mounted within the tank inside the valve means so that the compressed air within the bottle must first pass through the filter before entering the tank.

A still further object of the present invention is to provide such a device wherein an air valve is mounted on the bottle for filling same by any conventional means.

Other objects, advantages and novel features of the invention will become apparent from the following description of the invention when considered in conjunction with the single drawing showing the device in accordance with the present invention in exploded plan view, partly in section.

In the drawing, wherein like reference characters refer to like and corresponding parts, a compressed air bottle or cylinder 10 is shown as having a valve means 11 mounted thereon which includes a valve seat 12 and a needle-valve 13 for cooprationtherewith. The needle-valve is held in place by a threaded engagement as at 14,15 and is manipulated in any normal manner as by a thumb cap 16. A short extension 17 having a valve exit opening therein is provided on the valve means on which a hollow tube 18 is mounted at one end. At the other end of tube 18, there is mounted a porous air stone or other type diffuser 19.

An internally threaded collar 25 extending inwardly of a wall 30 of cylinder 10 is provided to facilitate a removable connection of valve means 11 with the cylinder as at 26. The valve means includes an elongated hollow member 27 extending both inwardly and outwardly of collar 26. An outlet opening 28 for the compressed air is provided at the inner end 29 of member 27.

An air valve 21 is also mounted on the bottle for admiting compressed air therewithin, the valve 21 comprising a spring-biased valve found on conventional air tires capable of being opened by admitting compressed air into the bottle therethrough from a standard service station air pump. Also, a cap 22 of plastic or other material is provided for the air valve 21 when not in use.

The air bottle is also provided with an aluminum or ceramic or other suitable type filter 23 located below the vavle means 11 so that, when the needle-valve 13 is moved to open the flow of air through the valve means, the air must pass first through the filter and into the valve means before entering the bait tank 24. It can be seen that filter 23 is disposed in member 27 in engagement with the inner wall thereof and extending between end 26 and wall 30 of the cylinder.

In operation, the operator must completely close the valve means by firmly securing the needle-valve 13 in place against the valve seat 12. The bottle 10 is then filled with 100 to 150 pounds per square inch of compressed air from the standard tire pump at a service station or with a conventional bicycle tire pump. The air bottle is then located at any convenient location near the bait tank or bucket and the air stone is placed in the bottom thereof as shown in the drawing. The air valve 13 may then be opened to adjust the air flow to effect a very fine stream of air bubbles into the tank. The resulting oxygenation keeps the natural live bait kicking and fresh for eight to twelve hours on a single tank filling.

From the foregoing it can be seen that a portable bait tank aerator has been devised for keeping live bait vigorous and healthy until ready for use by means of a simple and easily operated device having relatively few moving parts, thereby significantly reducing the cost of manufacture of the aerator device which is economical and highly efficient in its use. The live bait is therefore kept fresh so as to increase the opportunity of hooking the fish. The present device may also serve as an auxiliary aerator for aquariums, particularly wnen power failures prevent normal aerating equipment from operating. The amount of air released through the valve means is controlled by the operator depending on the amount of live bait to be kept fresh. Also, the built-in air filter avoids clogging of the valve means or air stone by impurities and, because of the simplicity of the present design, the portable aerator is virtually maintenance free.

Obviously many modifications and variations of the present invention are possible in the light of the above teachings. It is therefore to be understood that within the scope of the appended claims, the invention may be practiced otherwise than as specifically described.

What is claimed is:

1. A device for aerating a bait tank comprising a closed cylinder containing a compressed aerating fluid a fluid valve on said cylinder for admitting compressed fluid thereinto, a threaded opening in said cylinder defined by an internally threaded collar extending inwardly of a wall of said cylinder, a removable valve unit threadedly engaged with said threaded collar, said valve unit comprising an elongated hollow member extending both outwardly of said collar and slightly inwardly thereof, an outlet opening for the compressed fluid provided at the inner end of said hollow member, a fluid filter element disposed in said hollow member completely engaging the inner wall thereof and extending between said inner end and said cylinder wall, a valve seat mounted in the intermediate portion of said hollow member and spaced outwardly of said cylinder wall, a valve exit opening element on said hollow member located between said valve seat and the outer end portion of said hollow member, a valve pin member threadedly engaged with the outer end portion of said hollow member outwardly of said exit opening element and being movable into and out of engagement with said valve seat to respectively close and open same, the device further comprising a fluid diffuser element of porous stone, and an elongated tube detachably mounted on said exit opening element, said tube operatively interconnecting said exit opening element with said porous stone, hereby a quantity of finely dispersed filtered fluid may be metered into a bait tank for aerating the water therein as said valve seat is opened by operation of said valve pin member.

* * * * *